US008078213B2

(12) United States Patent
Hans et al.

(10) Patent No.: US 8,078,213 B2
(45) Date of Patent: *Dec. 13, 2011

(54) METHOD OF REGULATING THE TRANSMISSION POWER OF A MASTER STATION AND A SLAVE STATION FOR IMPLEMENTATION OF THE METHOD

(75) Inventors: Martin Hans, Hildesheim (DE); Frank Kowalewski, Salzgitter (DE); Josef Laumen, Hildesheim (DE); Gunnar Schmidt, Wolfenbuettel (DE); Siegfried Baer, Pforzheim (DE); Mark Beckmann, Braunschweig (DE)

(73) Assignee: IPCOM GmbH & Co. KG, Pullach (DE)

( * ) Notice: Subject to any disclaimer, the term of this patent is extended or adjusted under 35 U.S.C. 154(b) by 469 days.

This patent is subject to a terminal disclaimer.

(21) Appl. No.: 12/228,631

(22) Filed: Aug. 13, 2008

(65) Prior Publication Data
US 2008/0311948 A1    Dec. 18, 2008

Related U.S. Application Data

(63) Continuation of application No. 10/148,785, filed as application No. PCT/DE00/03759 on Oct. 25, 2000, now Pat. No. 7,430,184.

(30) Foreign Application Priority Data

Dec. 3, 1999    (DE) .................................. 199 58 383

(51) Int. Cl.
*H04B 7/00*    (2006.01)

(52) U.S. Cl. ......... 455/522; 455/69; 455/70; 455/67.11; 370/318; 370/319; 370/320

(58) Field of Classification Search .................. 455/522, 455/69–70, 67.11; 370/318–320
See application file for complete search history.

(56) References Cited

U.S. PATENT DOCUMENTS

| 5,844,935 | A  | * | 12/1998 | Shoji .............................. 375/150 |
| 5,870,393 | A  | * | 2/1999  | Yano et al. ..................... 370/335 |
| 6,085,107 | A  | * | 7/2000  | Persson et al. ................ 455/522 |
| 6,334,047 | B1 | * | 12/2001 | Andersson et al. ............. 455/69 |

(Continued)

FOREIGN PATENT DOCUMENTS

EP    0 863 618    9/1998

(Continued)

OTHER PUBLICATIONS

Salmasi, A., et al., "On the system design aspects of code division multiple access (CDMA) applied to digital cellular and personal communications networks," IEEE, 1999.

(Continued)

*Primary Examiner* — Fayyaz Alam
(74) *Attorney, Agent, or Firm* — Kenyon & Kenyon LLP

(57) ABSTRACT

A slave station and a method of regulating the transmission power a master station are described, which permit an estimate of the signal/interference ratio in a transmission system without sending a pilot sequence, the transmission power being regulated as a function of an estimate of the signal/interference ratio. In a transmission system, in particular a CDMA transmission system, useful signals assigned to different communicating subscribers are separated by orthogonal codes. A useful signal assigned to one communicating subscriber is derived by using one of the codes from a signal received at least in the slave station from the master station and is compared as a reference signal with the received signal to estimate the signal/interference ratio.

11 Claims, 1 Drawing Sheet

U.S. PATENT DOCUMENTS 6,904,076 B1 * 6/2005 Tsutsui et al. ................ 375/130

FOREIGN PATENT DOCUMENTS

JP 7-095655 4/1995
JP 9-135193 5/1997

OTHER PUBLICATIONS

3rd Generation Partnership Project; Technical Specification Group Radio Access Network; Physical channels and mapping of transport channels onto physical channels (FDD). 3G TS 25.211, version 3.0.0, Oct. 1999.

Adachi F. et al.: "Coherent Mutlicode DS-CDMA Mobile Radio Access" IEICE Transactions on Communications, JP, Institute of Electronics Information and Comm. Eng. Tokyo, Bd. E798, Nr. 9, Sep. 1, 1996, pp. 1316-1324, XP000636071 ISSN: 0916-8516 p. 1316.

Seo S. et al.: "SIR-Based Transmit Power Control of Reverse Link for Coherent DS-CDMA Mobile Radio" IEICE Transactions on Communciations, Institute of Electronics Information and Comm. Eng. Tokyo, JP, Bd. E81-B, Nr. 7, Jul. 1, 1998, pp. 1508-1516, XP000790185 ISSN: 0916-8516 p. 1509.

"Technical Specification", 3 GPP RAN 25.214 V 1.3.1, Sep. 1999.

"Simulation of Communication Systems" Jerochim et al., Plenum Press, New York, 1992.

* cited by examiner

METHOD OF REGULATING THE TRANSMISSION POWER OF A MASTER STATION AND A SLAVE STATION FOR IMPLEMENTATION OF THE METHOD

CROSS-REFERENCE TO RELATED APPLICATIONS

The present application is a continuation of U.S. patent application Ser. No. 10/148,785 filed on Sep. 16, 2002 now U.S. Pat. No. 7,430,184, which in turn is a U.S. national-phase application of PCT/DE00/03759 filed on Oct. 25, 2000, and which U.S. patent application Ser. No. 10/148,785 claimed priority to German Patent Application No. 199 58 383.8 filed on Dec. 3, 1999.

FIELD OF THE INVENTION

The present invention relates to a method for regulating the transmission power of a master station and a slave station.

BACKGROUND INFORMATION

"Technical Specification," 3 GPP RAN 25.214 V 1.3.1, September 1999 describes a method of regulating power for the uplink channel of a mobile station to a base station in a mobile wireless system. A closed loop is provided, regulating the transmission power of the mobile station, so that the signal/interference ratio (SIR) received in the base station via the uplink channel may be kept at a predetermined target level. In the base station, a signal/interference ratio may be estimated from the signal received from the mobile station. The base station may generate TPC (transmit power control) commands as a function of the estimated signal/interference ratio and may transmit the TPC commands to the mobile station. If the estimated signal/interference ratio is greater than the selected signal/interference ratio, a zero may be transmitted with the TPC command to be transmitted, whereas if the estimated signal/interference ratio is below the selected signal/interference ratio, a one may be transmitted with the TPC (transmit power control) command. In this manner, the transmission power may be adjusted on the basis of the TPC commands received in the mobile station, so that the estimated signal/interference ratio may be corrected by the selected signal/interference ratio.

SUMMARY OF THE INVENTION

To regulate the transmission power of a master station and the slave station according to an example method of the present invention, signals assigned to different communication stations in the transmission system, in particular a CDMA (code division multiple access) transmission system, may be separated by orthogonal codes; a useful signal assigned to a communicating subscriber may be derived from a signal received in the slave station at least from the master station by using one of the codes, and this useful signal may be compared with the received signal as a reference signal to estimate the signal/interference ratio. In this manner the signal/interference ratio may be estimated only with the help of the received signal without having to transmit known pilot sequences to the slave station and compare them with reference pilot sequences there. The data rate for signal transmission from the master station to the slave station may be increased by omitting the transmission of such pilot sequences.

The example method may be refined and improved.

The received signal may be despread by using the selected code. A signal despread in this manner may be subjected to data detection and the signal thus detected may be spread again using the selected code to form the reference signal. In this manner, a useful signal having reduced interference may be derived from a received signal which includes several useful signals of different mutually orthogonal codings at transmission time, and this useful signal may be made available as a reference signal for comparison with the received signal. The signal to be transmitted at least from the master station to the slave station may be predistorted in the master station, in particular by using a joint predistortion method. This may prevent any negative effect on the signal received in the slave station due to intersymbol interference (ISI) resulting from multipath transmission of the signal to be transmitted, so that a comparatively simple equalization may be performed in the slave station in comparison with a joint detection method, for example, or equalization may be completely omitted.

DETAILED DESCRIPTION

Figure 1:
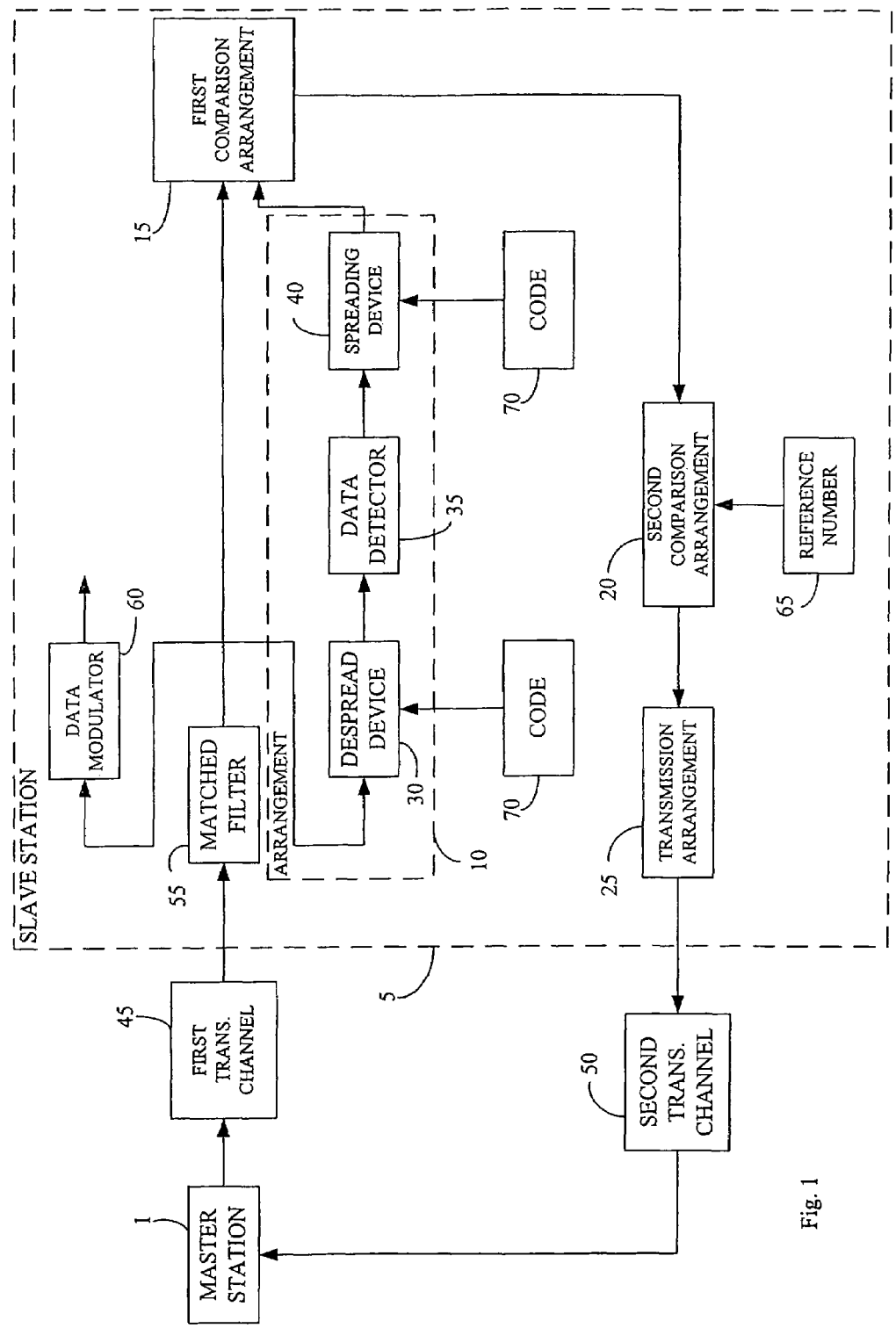
FIG. 1 shows a block diagram of a slave station according to an example embodiment of the present invention for implementation of an example method according to the present invention.

FIG. 1 shows a master station 1 and a slave station 5 in a transmission system. This transmission system may be, for example, a mobile wireless system or a broadband transmission system using cable connections. Master station 1 sends signals over a first transmission channel 45 to slave station 5, which in turn sends signals over a second transmission channel 50 to master station 1. As an example, the transmission system described below is configured as a mobile wireless system. Master station 1 may be a base station, for example, which covers a wireless cell in the mobile wireless system in which slave station 5 is located. Slave station 5 may be a mobile terminal, e.g., a mobile telephone. The mobile wireless system may be configured according to the GSM (Global System for Mobile Communications) standard or according to the UMTS (Universal Mobile Telecommunication System) standard or the like.

First transmission channel 45 is a downlink channel from master station 1, configured as a base station, to slave station 5, configured as a mobile telephone. Second transmission channel 50, however, is an uplink channel from mobile telephone 5 to base station 1.

Conversely, slave station 5 may function as the base station and master station 1 may be a mobile telephone. In this case, first transmission channel 45 would be the uplink channel and second transmission channel 50 would be the downlink channel.

The case where the transmission system is a mobile wireless system in which master station 1 is a base station and slave station 5 is a mobile telephone is described below as an example. It shall be assumed here that mobile telephone 5 is one of many slave stations or mobile telephones arranged in the wireless cell covered by base station 1. Each of these mobile telephones is a communicating subscriber. The useful signals sent out from base station 1 to the individual communicating subscribers are multiplexed for transmission to the individual communicating subscribers. To do so, the individual useful signals are encoded by spreading codes before being transmitted from base station 1 to the individual mobile telephones. Each communicating subscriber is assigned a spreading code, so that the useful signals to be transmitted from base station 1 to the respective communicating subscriber are coded with the spreading code assigned to this communicating subscriber. Due to the different spreading codes, the signals assigned to the individual communicating subscribers may be superimposed chronologically and spectrally for transmission to the individual communicating subscribers on a common transmission channel and separated again on reception if the spreading code assigned to a communicating subscriber is known by the receiving communicating subscriber. Such a transmission method in which all the communicating subscribers are able to access the transmission channel simultaneously is the CDMA (code division multiple access) transmission method. The mobile wireless system described here is based on this method as an example. Due to the chronological and spectral superimposition of the useful signals sent out from base station 1 to the individual communicating subscribers, as described here, the useful signals of one communicating subscriber constitute an interference signal for the useful signals of the other communicating subscribers.

In the following description, mobile telephone 5 shall be considered as representative of the communicating subscribers in the wireless cell covered by base station 1. To ensure a certain quality for transmission of the useful signal assigned to mobile telephone 5, the ratio of the power of this useful signal to the power of all other useful signals which are intended for other communicating subscribers and may potentially interfere with the useful signal assigned to mobile telephone 5 may be required not to drop below a predetermined target value $SIR_Z$ (signal-to-interference ratio) at the receiver input of mobile telephone 5. At the same time, this predetermined target value $SIR_Z$ may not be exceeded either, because otherwise the useful signals of the other communicating subscribers may have more interference than is desirable. Preselected target value $SIR_Z$ is a preselected signal/interference ratio between the level of the desired useful signal and the interference level generated by the useful signals for the other communicating subscribers.

To achieve preselected target value $SIR_Z$ for the signal/interference ratio, power regulation having a closed loop is provided. In the downlink connection from base station 1 to mobile telephone 5, an estimate $SIR_S$ for the signal/interference ratio is determined at mobile telephone 5 and compared with selected target value $SIR_Z$. Depending on the results of this comparison, mobile telephone 5 may then generate signaling signals, in the manner described in the publication "Technical Specification," 3 GPP RAN 25.214 V 1.3.1, e.g., in the form of the TPC (transmit power control) commands described above and send them to base station 1 in the uplink connection to adjust the transmission power of base station 1 for emission of signals to mobile telephone 5 so that estimate $SIR_S$ for the signal/interference ratio is adapted to selected target value $SIR_Z$.

Determination of estimate $SIR_S$ for the signal/interference ratio has so far presupposed a knowledge of a portion of the data transmitted. In addition to the actual data, pilot sequences which are also known to the receiver, which has the form of mobile telephone 5 here, are also transmitted. These may also be used in particular for channel equalization in the receiver and have so far been used to determine estimate $SIR_S$ for the signal/interference ratio.

According to the an example embodiment and/or example method of the present invention, mobile telephone 5 includes a matched filter 55 which receives signals sent from base station 1 over first transmission channel 45 and is adapted to the pulse shaping performed at the transmitter end. One output of matched filter 55 is connected to a data demodulator 60. The output of matched filter 55 is also connected to first comparison arrangement 15. In addition, the output of matched filter 55 is also connected to a despreading device 30. Data modulator 60 demodulates the received signals processed by matched filter 55 in the manner described above and sends them to other circuits of mobile telephone 5 (not shown in the figure) where data contained in the received signals intended for mobile telephone 5 is extracted and processed further.

Despreading device 30 also receives code 70 assigned to mobile telephone 5. One output of despreading device 30 is connected to a data detector 35, the output of which is in turn connected to a spreading device 40. Spreading device 40 also receives code 70, which is assigned to mobile telephone 5. One output of spreading device 40, like the output of matched filter 55, is connected to first comparison arrangement 15, the output of which is connected to second comparison arrangement 20. In addition, preselected target value $SIR_Z$, labeled with reference number 65 in the figure, is also connected to second comparison arrangement 20. One output of second comparison arrangement 20 is connected to transmission arrangement 25, the output of which is connected to base station 1 via second transmission channel 50. Communication between base station 1 and mobile telephone 5 occurs via appropriate wireless signals. Despreading device 30, data detector 35 and spreading device 40 are arrangement 10 for deriving a reference signal from the signal received from base station 1 via matched filter 55. Matched filter 55, data demodulator 60, first comparison arrangement 15, despreading device 30, data detector 35, spreading device 40, second comparison arrangement 20 and transmitting arrangement 25 are components of mobile telephone 5 in the example described here. Code 70 and preselected target value $SIR_Z$ may each be stored in one or more memories of mobile telephone 5.

Base station 1, first transmission channel 45, matched filter 55, arrangement 10 for deriving a reference signal, first comparison arrangement 15, second comparison arrangement 20, transmission arrangement 25 and second transmission channel 50 form a closed loop 75 for regulating the transmission power of base station 1 for emission of signals to mobile telephone 5. The signal received at mobile telephone 5 from base station 1 is formed by chronological and spectral superimposition of various useful signals for various communicating subscribers, these useful signals having been spread before being sent by base station 1 using different mutually orthogonal codes.

In an ideal transmission of the various multiplexed useful signals from base station 1 to mobile telephone 5, in which noise effects need not be taken into account, the useful signals assigned to mobile telephone 5 may be extracted from the received useful signals without interference by using the code assigned to mobile telephone 5, although the signal received by mobile telephone 5 has multiple access interference (MAI) due to the chronological and spectral superimposition of the individual useful signals. This may be due to the feature that the orthogonality of the codes may not be lost in such an ideal transmission and may be still in effect at receiving mobile telephone 5. If the output signal of matched filter 55 is despread by despreading device 30 by using code 70 assigned to mobile telephone 5, this may yield the useful signal assigned to mobile telephone 5 without interference at the output of despreading device 30.

As a rule, however, first transmission channel 45 may not be ideal, i.e., it may be required to take into account noise effects and the orthogonality of the individual useful signals may be reduced. Interference is understood below as the sum of the noise component and the MAI. In this case, only the interference component based on orthogonal coding of the useful signals but not the interference component which is subject to noise may be eliminated by despreading device 30. The signal extracted by despreading device 30 from the signal received at mobile telephone 5 is thus a useful signal which is assigned to mobile telephone 5 and is more or less subject to interference. For the ideal case without noise and retaining the orthogonality in first transmission channel 45, the output signal of despreading device 30 may be used directly as a reference signal for determining estimate $SIR_S$ of the signal/interference ratio because it may not be subject to interference. However, since the useful signal extracted by the despreading device may be subject to interference due to noise in first transmission channel 45, further processing by data detector 35 may be required to reduce the influence of noise. The data of the useful signal originally sent is restored by data detector 35. The signals may be transmitted from base station 1 to mobile telephone 5 in modulated form, and it is assumed below as an example that the QPSK (quadrature phase shift keying) method is used as the modulation method, as may be the case with a UMTS mobile wireless system, for example. In the DPSK method, signal vectors $S_i$ in the baseband are formed and may assume the following four values: $S_i$ 0 $\{(+1,+1),(-1,+1),(+1,-1),(-1,-1)\}$. These signal vectors $S_i$ are formed in base station 1 before being transmitted to mobile station 5. After transmission, which may be subject to noise, and after reception in mobile telephone 5, signal vectors $S_i$ may be in any desired position in a two-dimensional signal space. Original signal vectors $S_i$ are then recovered by data detector 35 by dividing the signal space into four quadrants. After transmission, the signal vectors are located in this two-dimensional signal space with any angle $v_i$. Data detection is then performed simply by the feature that one of four possible estimated signal vectors $\hat{s}_i$ is assigned to the respective angle $v_i$ of the respective signal vector after the transmission:

$$0 <= v_i < \pi/2 | \hat{s}_i = (+1,+1)$$

$$\pi/2 \leq v_i < \pi | \hat{s}_i = (-1,+1)$$

$$\pi \leq v_i < 3/2\pi | \hat{s}_i = (-1,-1)$$

$$3/2\pi \leq v_i < 2\pi | \hat{s}_i = (+1,-1)$$

These estimated signal vectors $\hat{s}_i$ are spread again in a third step by spreading device 40 using code 70 assigned to mobile telephone 5 and are then used to estimate the useful data sent to mobile telephone 5, and thus function as a reference signal for determining estimate $SIR_S$ of the signal/interference ratio. This estimate $SIR_S$ is determined by first comparison arrangement 15 by comparing the output signal of matched filter 55 with the reference signal formed by arrangement 10 for derivation of the reference signal. Those skilled in the art may be familiar with algorithms for this comparison, e.g., from the publication "Simulation of Communication Systems" Jerochim et al., Plenum Press, New York, 1992, which will not be discussed further here because they may not be required for the description of the present invention.

Estimate $SIR_S$ of the signal/interference ratio determined by first comparison arrangement 15 is compared by second comparison arrangement 20 with selected target value $SIR_Z$. Second comparison arrangement 20 may then derive TPC commands from this comparison in the manner described above, which is described in the publication "Technical Specification" 3 GPP RAN 25.214 V 1.3.1, and transmit these commands to base station 1 via transmission arrangement 25 and second transmission channel 50 for appropriate adaptation of the transmission power of base station 1 for the signals to be transmitted to mobile telephone 5.

In order to determine estimate $SIR_S$ of the signal/interference ratio, no known pilot sequences to be transmitted from base station 1 to mobile telephone 5 may be required according to the present invention. Such pilot sequences may be omitted entirely if the signals to be transmitted are subjected to predistortion, e.g., by using a joint predistortion method, in base station 1. In this case, a complicated equalization of the received signals may be omitted in mobile telephone 5 and a simple correlation equalization, for example, may be used. Intersymbol interference (ISI) which may occur due to multipath reception of the signals transmitted over first transmission channel 45 may be eliminated by predistortion in base station 1. Since interference between different useful signals is not to be removed by despreading device 30, predistortion of the signals to be transmitted in base station 1 may result in a reference signal which is less subject to interference and thus may result in a better estimate of the signal/interference ratio by first comparison arrangement 15. The fewer the transmission errors that occur on first transmission channel 45, the better the estimate may be. A bit error rate of $10^{-2}$ may be sufficient in transmission without error coding for the accuracy of the estimate of the signal/interference ratio.

If no predistortion is performed at base station 1, the influence of the interference of the signal received in mobile telephone 5 from base station 1 may be reduced using a more complicated equalizer, e.g., by using a RAKE equalizer or a joint detection method. This equalization may be performed following matched filter 55, in which case the equalized signals are to be sent to data demodulator 60, first comparison arrangement 15 and despreading device 30. In this manner the influence of intersymbol interference may be reduced with the reference signal formed by arrangement 10 for derivation and with the signal received at mobile telephone 5.

If the estimated signal/interference ratio drops below predetermined target value $SIR_Z$, then the transmission power of base station 1 for emission of the useful signal assigned to mobile telephone 5 may be increased. If the estimated signal/interference ratio exceeds selected target value $SIR_Z$, the transmission power of base station 1 for emission of useful signal assigned to mobile telephone 5 may be reduced accordingly.

What is claimed is:

1. A method for controlling, in a mobile telephone, a ratio $SNR_S$ of a received useful data signal to interference, the method comprising:
performing in the mobile telephone the following:
obtaining an estimate of the ratio $SNR_S$;
comparing the obtained estimate of the ratio $SNR_S$ with a predetermined target value $SNR_Z$; and
generating, as a result of said comparison, power control signals, and transmitting said power control signals to a base station, said power control signals instructing said base station to adjust a transmission power of signals intended for reception by said mobile telephone;
wherein the obtaining of the estimate of the ratio $SNR_S$ includes:

despreading a received signal using a code assigned to said mobile telephone to obtain a despread signal;

demodulating said despread signal to obtain a demodulated signal;

respreading said demodulated signal to obtain a respread signal; and comparing said respread signal with said received signal.

2. The method according to claim 1, wherein the predetermined target value $SNR_Z$ is a pre-selected signal to interference ratio of a level of the useful data signal and an interference level generated by useful data signals for other mobile telephones.

3. The method according to claim 1, wherein the mobile telephone utilizes a RAKE equalizer for obtaining an equalized signal prior to the step of despreading.

4. The method according to claim 1, wherein if said ratio $SNR_S$ is lower than the ratio $SNR_Z$, a transmission power of the useful data signal intended for reception by said mobile telephone is increased.

5. The method according to claim 1, wherein if said ratio $SNR_S$ is greater than the ratio $SNR_Z$, a transmission power of the useful data signal intended for reception by said mobile telephone is decreased.

6. A method for controlling the transmission power of a transmitting station in a transmission system as a function of an estimate of a signal-interference-ratio in a receiving station, the method comprising:

separating payload signals associated with different communication subscribers by using orthogonal codes in the transmission system, wherein a payload signal associated with a particular corresponding communication subscriber is derived as a reference signal by using a selected one of the orthogonal codes from a signal received in the receiving station from the transmitting station, wherein the received signal is despread using the selected code, the despread signal is subjected to data detection, and the signal subjected to data detection is respread using the selected code in order to form the reference signal; and comparing the derived reference signal with the received signal in order to estimate the signal-to-interference ratio.

7. The method according to claim 6, wherein a signal to be transmitted at least from the transmitting station to the receiving station is subject to a predistortion in the transmitting station.

8. The method according to claim 7, wherein said predistortion is performed in accordance with a joint predistortion method.

9. The method according to claim 1, wherein the signal received by the mobile telephone is modulated by quadrature-phase-shift-keying method.

10. The method according to claim 6, wherein the signal to be transmitted at least from the transmitting station to the receiving station is modulated by means of a quadrature phase shift keying method.

11. A mobile telephony receiving station, comprising:

a signal despreading device having an input for receiving a filtered received signal, an input for receiving a code, and an output for outputting a despread signal;

a data detector having an input for receiving said despread signal and an output for outputting a detected signal;

a respreading device having an input for receiving said detected signal, an input for receiving said code, and an output for outputting a respread signal; and a comparator having an input for receiving said respread signal, an input for receiving said filtered received signal, and an output for outputting a transmit power command.

* * * * *